US009461760B2

(12) United States Patent
Sullivan et al.

(10) Patent No.: US 9,461,760 B2
(45) Date of Patent: Oct. 4, 2016

(54) REMEDIATION OF TELEVISION SIGNALS USING A NETWORK BACK-CHANNEL

(75) Inventors: Marc Sullivan, Austin, TX (US); Steven M. Belz, Cedar Park, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 889 days.

(21) Appl. No.: 12/260,872

(22) Filed: Oct. 29, 2008

(65) Prior Publication Data

US 2010/0104024 A1 Apr. 29, 2010

(51) Int. Cl.
| | |
|---|---|
| H04H 60/82 | (2008.01) |
| H04L 1/18 | (2006.01) |
| H04N 21/2365 | (2011.01) |
| H04H 60/12 | (2008.01) |
| H04H 20/65 | (2008.01) |

(52) U.S. Cl.
CPC ............ H04H 60/12 (2013.01); H04H 20/65 (2013.01); H04H 60/82 (2013.01); H04L 1/1803 (2013.01)

(58) Field of Classification Search
CPC .... H04H 20/65; H04H 60/82; H01L 1/1803; H01L 12/6418; H01L 2012/6472; H01L 2012/6475; H01L 63/04; H04N 7/00; H04N 7/10; H04N 7/50; H04N 7/64; H04N 7/68; H04N 7/106; H04N 7/108; H04N 19/37; H04N 21/00; H04N 21/2225; H04N 21/2365–21/238; H04N 21/262; H04N 21/2665; H04N 21/4347–21/4349
USPC ........ 370/230, 252, 347, 394, 395; 348/461, 348/466, 468; 725/135, 136, 139, 140, 142; 714/756, 758, 759, 784, 785, 793
See application file for complete search history.

(56) References Cited

U.S. PATENT DOCUMENTS

| | | | |
|---|---|---|---|
| 4,285,004 A | 8/1981 | Morrison et al. | |
| 4,356,507 A | 10/1982 | Goldberg et al. | |
| 4,447,902 A | 5/1984 | Wilkinson | |
| 4,511,922 A | 4/1985 | Lewis, Jr. | |
| 4,577,237 A | 3/1986 | Collins | |
| 5,396,504 A | 3/1995 | Pack | |
| 5,987,518 A | 11/1999 | Gotwald | |
| 6,061,096 A | 5/2000 | Limberg | |
| 6,144,399 A * | 11/2000 | Manchester et al. | 725/127 |
| 6,307,896 B1 | 10/2001 | Gumm et al. | |
| 6,357,028 B1 * | 3/2002 | Zhu | 714/751 |
| 6,366,621 B1 | 4/2002 | Kuntz et al. | |
| 6,426,780 B1 | 7/2002 | Limberg et al. | |
| 6,526,580 B2 | 2/2003 | Shimomura et al. | |
| 6,545,728 B1 | 4/2003 | Patel et al. | |
| 6,732,325 B1 | 5/2004 | Tash et al. | |
| 6,810,413 B1 * | 10/2004 | Rajakarunanayake et al. | 709/203 |
| 6,816,628 B1 | 11/2004 | Sarachik et al. | |
| 6,999,127 B2 * | 2/2006 | Ryoo et al. | 348/441 |
| 7,020,828 B2 | 3/2006 | Birru | |

(Continued)

*Primary Examiner* — Michael Thier
*Assistant Examiner* — Prince A Mensah
(74) *Attorney, Agent, or Firm* — Jackson Walker L.L.P.

(57) ABSTRACT

A method for remediating broadcast digital television signals is disclosed. A television signal is buffered by a multimedia client, and analyzed for errors. If errors are detected, replacement data for the corrupted data are requested from a service provider using a network back-channel. The replacement data are obtained from the broadcasting entity and sent back to the multimedia client. The replacement data are used to generate and display a faultless version of the digital television signal.

11 Claims, 7 Drawing Sheets

(56) References Cited

U.S. PATENT DOCUMENTS

| | | |
|---|---|---|
| 7,155,734 B1 | 12/2006 | Shimomura et al. |
| 7,296,204 B2 | 11/2007 | Merritt |
| 2001/0004352 A1* | 6/2001 | Watanabe et al. ............ 370/252 |
| 2002/0056100 A1 | 5/2002 | Shimomura et al. |
| 2002/0128029 A1* | 9/2002 | Nishikawa ............ H04H 20/76 455/517 |
| 2002/0174423 A1* | 11/2002 | Fifield et al. ...................... 725/1 |
| 2002/0188748 A1* | 12/2002 | Blackwell et al. ........... 709/232 |
| 2003/0030750 A1* | 2/2003 | Hoarty et al. ................. 348/461 |
| 2003/0121037 A1* | 6/2003 | Swix et al. ..................... 725/34 |
| 2004/0091059 A1 | 5/2004 | Chen |
| 2004/0136373 A1* | 7/2004 | Bareis ........................... 370/392 |
| 2004/0160452 A1* | 8/2004 | Song et al. ................... 345/560 |
| 2005/0036478 A1* | 2/2005 | Neilson et al. ............... 370/350 |
| 2005/0169255 A1 | 8/2005 | Shimomura et al. |
| 2006/0168636 A1 | 7/2006 | Pugel et al. |
| 2007/0140257 A1 | 6/2007 | Lee et al. |
| 2007/0153888 A1 | 7/2007 | Kim et al. |
| 2007/0153933 A1 | 7/2007 | Lee et al. |
| 2007/0172003 A1 | 7/2007 | Kim et al. |
| 2007/0195889 A1 | 8/2007 | Hong et al. |
| 2007/0223535 A1* | 9/2007 | Hamazaki ..................... 370/486 |
| 2007/0253503 A1 | 11/2007 | Kim et al. |
| 2007/0274401 A1 | 11/2007 | Lee et al. |
| 2007/0291854 A1 | 12/2007 | Song et al. |
| 2007/0297544 A1 | 12/2007 | Choi et al. |
| 2008/0002765 A1 | 1/2008 | Song et al. |
| 2008/0031349 A1 | 2/2008 | Lee et al. |
| 2008/0069147 A1 | 3/2008 | Lee et al. |
| 2008/0080595 A1* | 4/2008 | Wang ............................ 375/211 |
| 2008/0089407 A1 | 4/2008 | Kim et al. |
| 2008/0199144 A1* | 8/2008 | Hailey et al. .................. 386/46 |
| 2009/0034633 A1* | 2/2009 | Rodirguez et al. ...... 375/240.28 |

\* cited by examiner

REMEDIATION OF TELEVISION SIGNALS USING A NETWORK BACK-CHANNEL

BACKGROUND

1. Field of the Disclosure

The present disclosure relates to the reception of television signals and, more particularly, to remediating corrupted television signals.

2. Description of the Related Art

During the transmission process, television signals may be subject to errors that corrupt the television signal. The delivery systems for television signals often include redundancy mechanisms for error correction.

DESCRIPTION OF THE EMBODIMENT(S)

In one aspect, a disclosed method for reconstructing a transmitted television signal includes receiving the transmitted television signal. Responsive to determining that the television signal is corrupted, replacement data may be requested for a corrupted portion of the television signal. The replacement data may be received via a network. At least some of the corrupted portion may then be restored using the received replacement data. The method may further include outputting the television signal to a display device, including the restored portion of the television signal.

In some embodiments, the requesting is performed via the network, which may be a packet-switched network, such as the Internet. The method may further include buffering the transmitted television signal, while said restoring may be performed on the buffered signal. The replacement data may be received from an entity transmitting the television signal. In different embodiments, the television signal is terrestrially broadcast, broadcast from a satellite, galvanically transmitted via coaxial cable, or optically transmitted via fiber optic cable.

In another aspect, a disclosed service for providing portions of a broadcast television signal to a multimedia client includes receiving a request for an original portion of a broadcast television signal from the multimedia client. The service may further include obtaining the original portion of the broadcast television signal, and in response to the request, returning to the multimedia client the obtained original portion.

In some embodiments, the receiving and the returning are performed using a packet-switched network. In some cases, a plurality of requests may be received from a respective plurality of multimedia clients, such that the service includes multicasting the obtained original portion to the plurality of multimedia clients. The television signal may be broadcast wirelessly to the plurality of multimedia clients, which may be located in a common geographic media market. The original portion may be obtained from an entity responsible for broadcasting the television signal. In some cases, the obtained original portion may be reformatted for streaming over a packet-switched network.

In a further aspect, a disclosed device for remediating a digital television signal includes a processor, a receiver to receive the digital television signal, and memory media coupled to the processor, including processor executable instructions. The instructions may be executable to, responsive to determining that the television signal is deteriorated, request a faultless portion of the digital television signal corresponding to a deteriorated portion of the digital television signal, receive the faultless portion, and remediate at least some of the deteriorated portion using the received faultless portion. The instructions may further be executable to output the digital television signal to a display device, including the remediated portion of the television signal. The device may further include a network adapter configured for coupling to a packet-switched network.

In some embodiments, the instructions executable to request and receive may include instructions executable to communicate via the packet-switched network, while the faultless portion may be received via the packet-switched network. In certain instances, instructions are further executable to convert the received faultless portion from a packed-based format to a digital television signal suitable for display on a display device. The instructions may further be executable to buffer the digital television signal received by the receiver, wherein said instructions executable to remediate include instructions executable to access the buffered signal.

In yet another aspect, disclosed computer-readable memory media include processor executable instructions for correcting a television signal. The instructions are executable to determine if a received television signal is at least in part distorted. If the television signal is at least in part distorted, then the instructions are executable to request, via a packet-switched network, an error-free portion of data corresponding to a distorted portion of the television signal. The instructions may further be executable to receive, via the packet-switched network, the error-free portion of data, and correct at least some of the distorted portion using at least some of the received error-free portion of data. The instructions may still further be executable to subsequently output the television signal to a display device, including the corrected portion of the television signal.

In some embodiments, memory media further includes program instructions executable to buffer the received television signal, wherein said instructions executable to correct include instructions executable to access the buffered signal. The signal may be buffered in a first-in first-out (FIFO) manner, while the program instructions executable to correct may manipulate the buffered signal. The instructions may further be executable to select a segment of the buffered television signal, wherein said instructions executable to determine use the selected segment as the received television signal.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
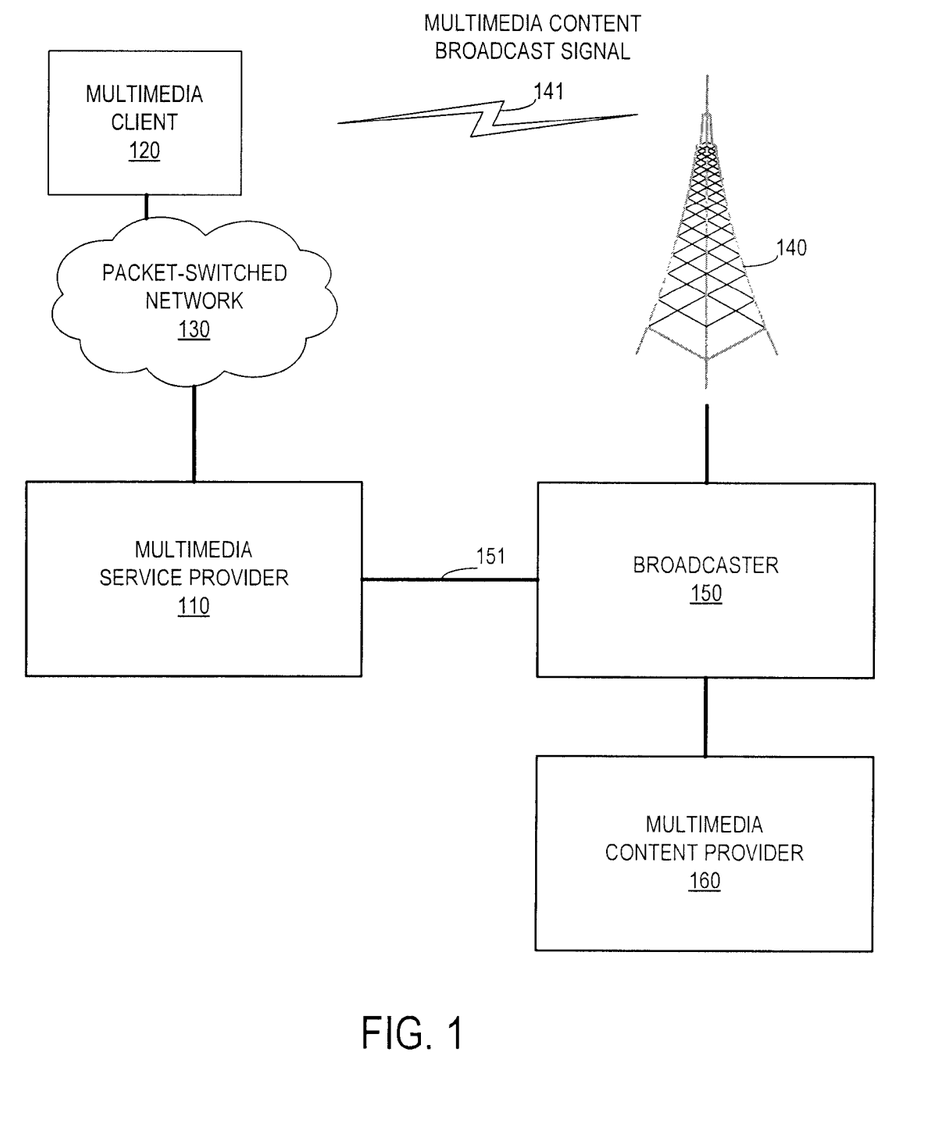
FIGS. 1-3 are block diagrams of selected elements of embodiments of multimedia content delivery systems.

Turning now to the drawings, FIG. 1 is a block diagram illustrating selected elements of an embodiment of a multimedia content delivery system. As depicted in FIG. 1, the system includes multimedia client 120, which is configured to receive multimedia content broadcast signal 141. Although one client 120 is depicted in FIG. 1, it will be understood that broadcast signal 141 may be transmitted to a plurality of receivers using broadcast tower 140. Broadcaster 150 uses broadcast tower 140 to disseminate the broadcast signal 141 over the air, including multimedia content, in a given geographical area. The geographic area may be a common geographic media market, such as a large city (not shown in FIG. 1).

Broadcaster 150 may itself be a producer of some portion of broadcast signal 141. Broadcaster 150 may also receive multimedia content from multimedia content provider 160, and use this content to generate broadcast signal 141. Content may be provided to content provider 160 via other backbone networks and/or switching networks (not shown in FIG. 1), such that different types of content may be acquired via different types of acquisition resources. In certain embodiments, broadcaster 150 is a television station and broadcast signal 141 is a digital television signal.

Multimedia client 120, as mentioned above, is configured to receive broadcast signal 141 for output of multimedia content (i.e., display, viewing, listening, etc.). In some embodiments, client 120 is configured to store broadcast signal 141, and output stored multimedia content at a later time. Accordingly, client 120 may be a television device with recording and display capability. In some cases, client 120 is an interactive multimedia device, including network capability (see FIG. 4).

As shown in FIG. 1, client 120 is configured for connectivity via packet-switched network 130. In some embodiments, network 130 is an Internet protocol (IP) compliant network. In certain cases, network 130 is the Internet. Network 130 may also be a private network. In some embodiments, network 130 is, at least in part, a coaxial cable network. In FIG. 1, network 130 provides connectivity between client 130 and multimedia service provider 110. IP-compliant embodiments of network 130 may include a physical layer of unshielded twist pair cables, fiber optic cables, or a combination thereof. In some configurations, digital subscriber line (DSL) compliant twisted pair connections are provided between client 120 and a front-side node (not depicted) in network 130, while fiber, cable or another broadband medium connects back-end resources to the node. In other embodiments, a broadband line may extend all the way to clients 120. As will be discussed in detail below, the connection via network 130 may serve as a back-channel for requesting and providing multimedia content.

As depicted in FIG. 1, multimedia service provider 110 is configured to communicate with client 120 via packet-switched network 130. It is noted that in some embodiments, network 130 is owned and/or operated by multimedia service provider 110. In other embodiments, a third party may own and/or operate at least a portion of network 130. Multimedia service provider 110 may further be configured to communicate with broadcaster 150 for obtaining multimedia content on request. In other words, multimedia service provider 110 may request and receive certain original portions of broadcast signal 141 via link 151. The link 151 may be a network, similar to network 130 described above, or other suitable connectivity system. In some cases, link 151 is configured to communicate independent of broadcast tower 140 and broadcast signal 141.

In FIG. 1, as client 120 receives multimedia broadcast signal 141, a determination may be made that some portions of broadcast signal 141 are corrupted, degenerated, deteriorated, distorted or otherwise in error. The client may request multimedia service provider 110 to send certain portions of the broadcast signal 141 via network 130. The multimedia service provider 110 may then obtain original, error-free portions of broadcast signal 141 from broadcaster 150, or another entity. The multimedia service provider 110 may then transmit the requested portions of broadcast signal 141 to client 120 via network 130. In some cases, multimedia service provider 110 may multicast original portions of broadcast signal 141 to a plurality of clients via network 130. Client 120 may receive the requested portions of broadcast signal 141 and use these to reconstruct multimedia content. In some embodiments, client 120 and multimedia service provider 110 are configured to reconstruct broadcast signal 141 in the original quality, such that broadcast errors or signal distortions introduced during broadcast are remediated.

Figure 2:
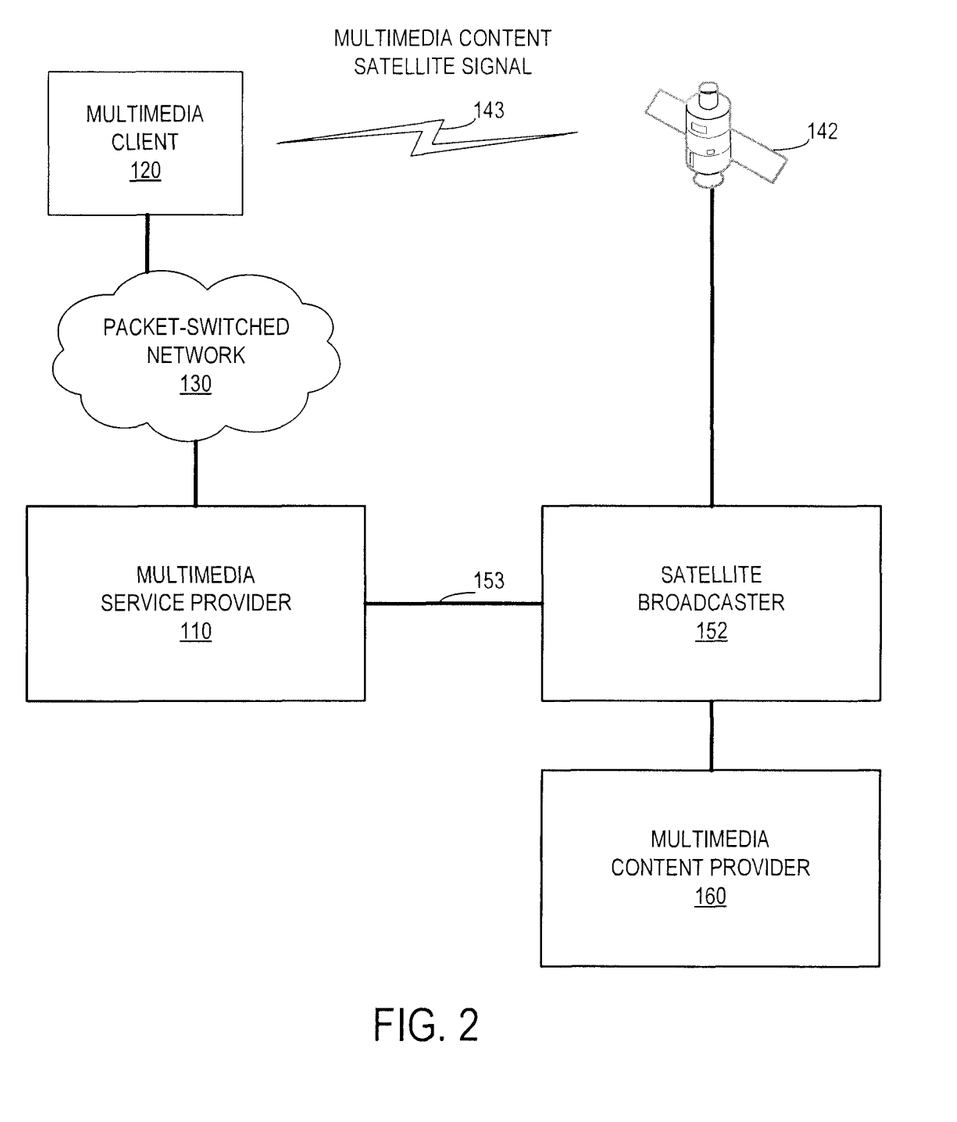

Turning now to FIG. 2, a block diagram illustrating selected elements of an embodiment of a multimedia content delivery system is shown. Like-numbered elements in FIG. 2 are discussed above with respect to FIG. 1. As depicted in FIG. 2, multimedia client 120 is configured to receive multimedia content satellite signal 143 transmitted to a plurality of receivers using satellite 142. Satellite broadcaster 152 uses satellite 142 to disseminate the satellite signal 143 over the air, including multimedia content, in a given geographical area. The geographic area may be a common geographic media market, such as a region or a nation (not shown in FIG. 1).

Satellite broadcaster 152 may itself be a producer of some portion of satellite signal 143. Satellite broadcaster 152 may also receive multimedia content from multimedia content provider 160, and use this content to uplink data to satellite 142, which generates satellite signal 143. In certain embodiments, satellite broadcaster 152 is a television network and satellite signal 143 is a digital television signal.

Multimedia client 120, as mentioned above, is configured to receive satellite signal 143 for output of multimedia content (i.e., display, viewing, listening, etc.). In some embodiments, client 120 is configured to store satellite signal 143, and output stored multimedia content at a later time.

As shown in FIG. 2, multimedia service provider 110 may further be configured to communicate with satellite broadcaster 152 for obtaining multimedia content on request. In other words, multimedia service provider 110 may request and receive certain original portions of satellite signal 143 via link 153. The link 153 may be a network, similar to packet-switched network 130 described above, or other suitable connectivity system. In some cases, link 153 is configured to communicate independent of satellite 142 and satellite signal 143.

In FIG. 2, as client 120 receives multimedia satellite signal 143, a determination may be made that some portions of satellite signal 143 are corrupted, degenerated, deteriorated, distorted or otherwise in error. The client may request multimedia service provider 110 to send certain portions of the satellite signal 143 via network 130. The multimedia service provider 110 may then obtain original, error-free portions of satellite signal 143 from satellite broadcaster 152, or another entity. The multimedia service provider 110 may then transmit the requested portions of satellite signal 143 to client 120 via network 130. In some cases, multimedia service provider 110 may multicast original portions of satellite signal 143 to a plurality of clients via network 130. Client 120 may receive the requested portions of signal 143 and use these to reconstruct multimedia content. In some embodiments, client 120 and multimedia service provider 110 are configured to reconstruct satellite signal 143 in the original quality, such that broadcast errors or signal distortions introduced during broadcast are remediated.

Figure 3:
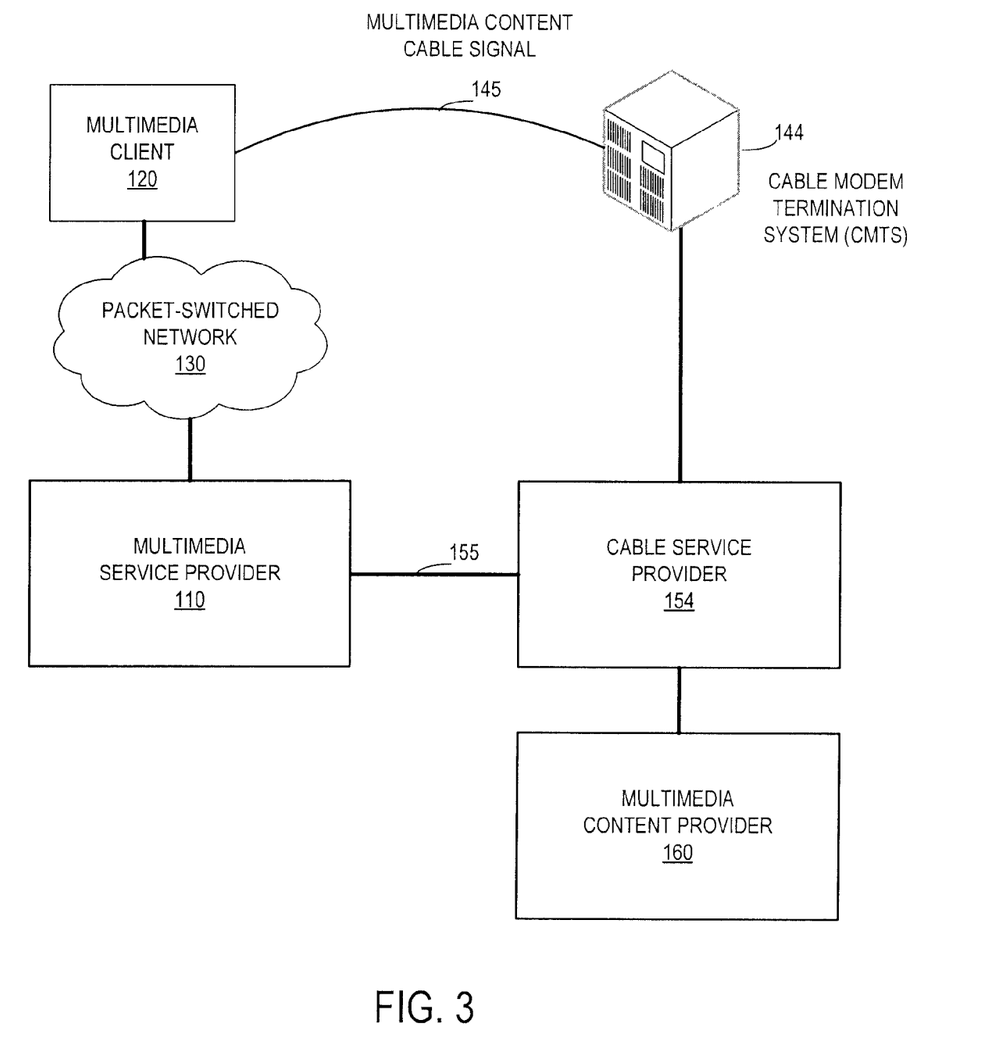

Turning now to FIG. 3, a block diagram illustrating selected elements of an embodiment of a multimedia content delivery system is shown. Like-numbered elements in FIG. 3 are discussed above with respect to FIG. 1. As depicted in FIG. 3, multimedia client 120 is configured to receive multimedia content cable signal 145 transmitted to a plurality of receivers using cable modem termination system (CMTS) 144. Cable service provider 154 may use CMTS 144 to disseminate the cable signal 145 in a given geographical area. The geographic area may be a common geographic media market (not shown in FIG. 1).

Cable provider 154 may itself be a producer of some portion of cable signal 145. Cable provider 154 may also receive multimedia content from multimedia content provider 160, and use this content to generate cable signal 145. In certain embodiments, cable signal 145 is a digital television signal.

Multimedia client 120, as mentioned above, is configured to receive cable signal 145 for output of multimedia content (i.e., display, viewing, listening, etc.). In some embodiments, client 120 is configured to store cable signal 145, and output stored multimedia content at a later time.

As shown in FIG. 3, multimedia service provider 110 may further be configured to communicate with cable provider 154 for obtaining multimedia content on request. In other words, multimedia service provider 110 may request and receive certain original portions of cable signal 145 via link 155. The link 155 may be a network, similar to network 130 described above, or other suitable connectivity system. In some cases, link 155 is configured to communicate independent of CMTS 144 and cable signal 145.

In FIG. 3, as client 120 receives multimedia cable signal 145, a determination may be made that some portions of cable signal 145 are corrupted, degenerated, deteriorated, distorted or otherwise in error. Client 120 may request multimedia service provider 110 to send certain portions of the cable signal 145 via packet-switched network 130. The multimedia service provider 110 may then obtain original, error-free portions of cable signal 145 from cable service provider 154, or another entity. The multimedia service provider 110 may then transmit the requested portions of cable signal 145 to client 120 via network 130. In some cases, multimedia service provider 110 may multicast original portions of cable signal 145 to a plurality of clients via network 130. Client 120 may receive the requested portions of cable signal 145 and use these to reconstruct multimedia content. In some embodiments, client 120 and multimedia service provider 110 are configured to reconstruct cable signal 145 in the original quality, such that transmission errors or signal distortions introduced during transmission are remediated.

Figure 4:
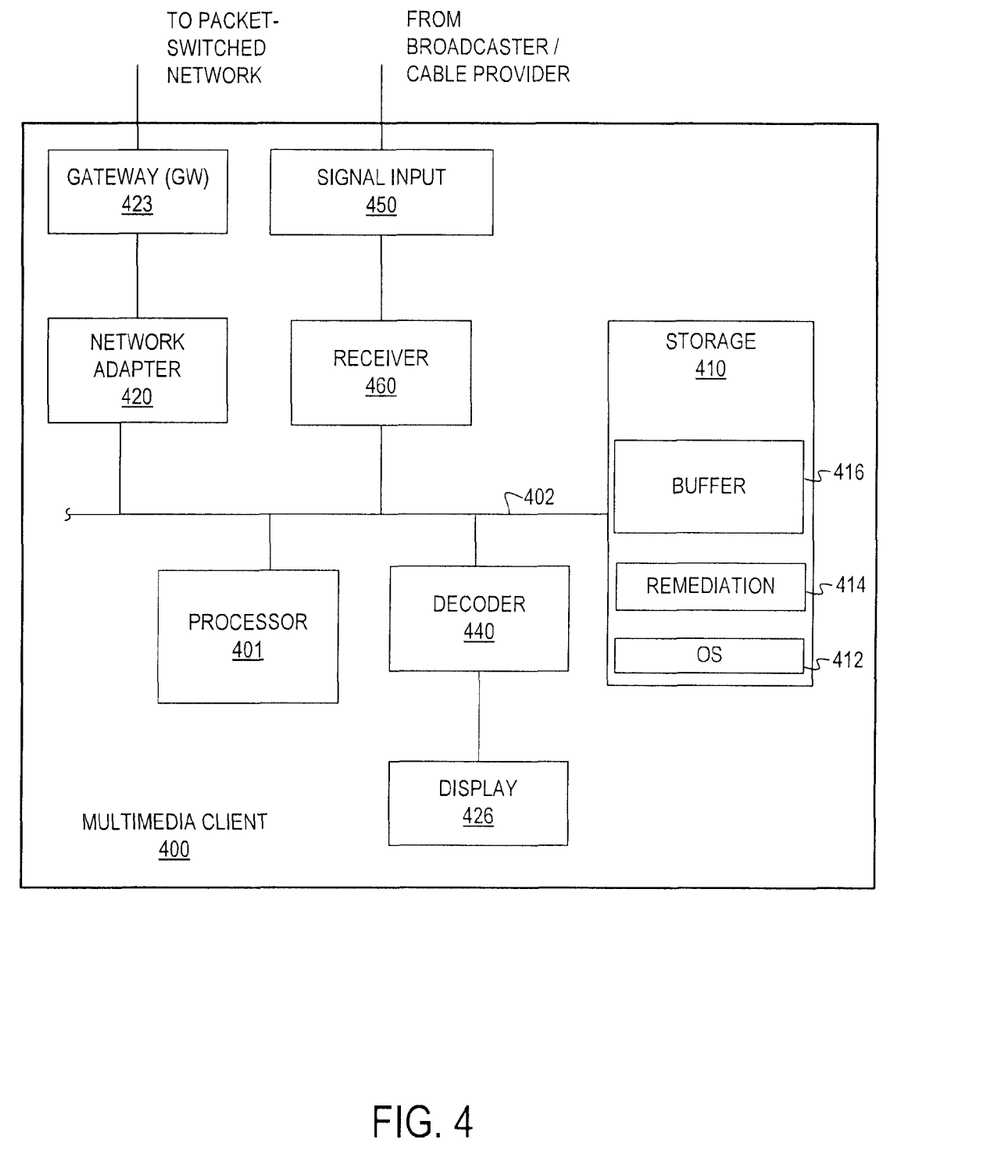
FIG. 4 is a block diagram of selected elements of an embodiment of a multimedia client device.

Turning now to FIG. 4, selected elements of one embodiment of multimedia client 400 are shown. In some instances, client 400 is exemplary of multimedia client 120 shown in FIG. 1. In the depicted embodiment, client 400 includes processor 401, decoder 440, storage 410, receiver 460, network adapter 420, gateway (GW) 423, signal input 450, and display device 426. It is noted that any combination of elements depicted in client 400 may be integrated into a single physical device, or interconnected as multiple physical devices.

In FIG. 4, GW 423 provides connectivity for client 400 to a network, such as network 130 (not explicitly shown in FIG. 4). GW 423 may provide an interface and conversion function between an external network and client-side local area network (LAN) (not shown in FIG. 4). In some embodiments, the client-side LAN may encompass or represent an IEEE 802.3 (Ethernet) LAN, an IEEE 802.11-type (WiFi) LAN, or a combination thereof. GW 423 may include elements of a conventional DSL or cable modem. GW 423, in some embodiments, may further include routing functionality for routing multimedia content, conventional data content, or a combination of both in compliance with IP or another network layer protocol. GW 423 may still further include WiFi or another type of wireless access point to extend the client-side LAN to wireless-capable devices in proximity to GW 423. GW 423 may also provide a firewall (not depicted) between connected networks or network segments.

Client 400, as depicted in FIG. 4, may further include a display device or, more simply, a display 426. Display 426 may be implemented as a TV, a liquid crystal display screen, a computer monitor, or the like. Display 426 may comply with a display standard such as NTSC (National Television System Committee), PAL (Phase Alternating Line), or another suitable standard. Display 426 may include one or more speakers to play audio content. It is noted that in some embodiments, client 400 is itself implemented as a television apparatus having connectivity and functionality, as described herein. Accordingly, client 400 is enabled and configured to process incoming multimedia signals to produce audio and visual signals suitable for delivery to display 426 and any speakers (not depicted).

In the embodiment depicted in FIG. 4, client 400 includes processor 401 coupled via shared bus 402 to storage media collectively identified as storage 410. Client 400, as depicted in FIG. 4, further includes network adapter 420 that may interface client 400 to a client-side LAN (not shown) and GW 423, as discussed above. Client 400 is further shown in FIG. 4 including receiver 460 which may receive, amplify, filter, rectify and/or demodulate an incoming multimedia signal from signal input 450. In embodiments involving receipt of a broadcast signal, such as broadcast signal 141 in FIG. 1 or satellite signal 143 in FIG. 2, signal input 450 may be a suitable antenna or antenna system, and may include a pre-amplifier. In other embodiments involving receipt of a cable signal, such as signal 145 in FIG. 3, signal input 450, alone or in combination with receiver 460, may be a cable modem.

As depicted in FIG. 4, client 400 may include decoder 440 that may receive video and/or audio streams and may generate native format video and/or audio streams. Decoder 440 may employ any of various widely distributed video decoding algorithms including any of the Motion Pictures Expert Group (MPEG) standards or Windows Media Video (WMV) standards including WMV 9, which has been standardized as Video Codec-1 (VC-1) by the Society of Motion Picture and Television Engineers. Similarly decoder 440 may employ any of various audio decoding algorithms including Dolby® Digital, Digital Theatre System (DTS) Coherent Acoustics, and Windows Media Audio (WMA). The native format video and/or audio streams may be processed by decoder 440 to produce analog video and/or audio signals in a format compliant with display 426, which itself may not be a part of client 400. Display 426 may comply with NTSC, PAL or any other suitable television standard.

In FIG. 4, storage 410 encompasses persistent and volatile media, fixed and removable media, and magnetic and semiconductor media. Storage 410 is operable to store instructions, data, or both. Storage 410 as shown includes sets or sequences of instructions, namely, an operating system 412 and a signal remediation program identified as remediation 414. Operating system 412 may be a UNIX or UNIX-like operating system, a Windows® family operating system, or another suitable operating system. Storage 410 may further include buffer 416 for storing incoming multimedia content signals, which may be provided by receiver 460 via bus 402. In some embodiments, buffer 416 is a first-in first-out (FIFO) buffer, while remediation 414 accesses and processes multimedia signals stored in buffer 416.

Figure 5:
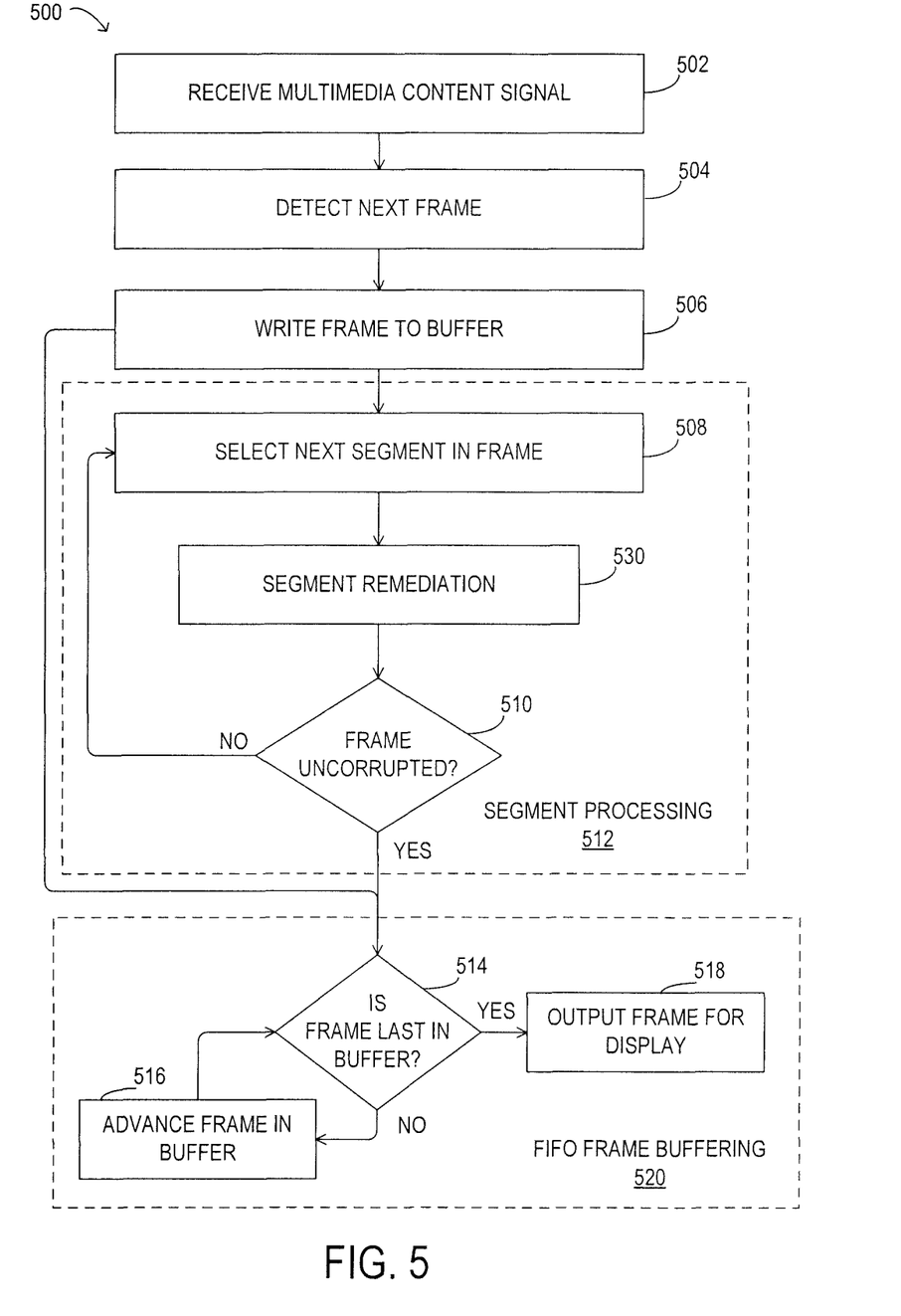
FIG. 5 illustrates an embodiment of a method for remediating a multimedia content signal.

Referring now to FIG. 5, one embodiment of a method 500 for remediating a multimedia content signal is shown. It is noted that the operations depicted in FIG. 5 may be rearranged, duplicated, or omitted in various embodiments of method 500. Client 400, as shown in FIG. 4, is configured to execute method 500.

For descriptive clarity in FIG. 5, the multimedia content signal is assumed to be a digital television signal in the following discussion. A "frame" of the television signal is referred to herein as a time-correlated portion of the digital television signal, for example, an individual image for a given video channel. In some embodiments, a frame represents time-correlated portions of data for a plurality of channels, irrespective if the channels are selected (i.e., for viewing or recording). A "segment" as used herein refers to an atomic portion of a frame, for which remediation according to the methods described herein may be requested. In different embodiments, the size of a selected segment may vary relative to the size of a frame. In some embodiments, a segment represents a given number of image pixels in an image frame of a television video signal.

In method 500, the incoming multimedia content signal is received (operation 502). In different embodiments of method 500, the incoming multimedia content signal may be broadcast signal 141, satellite signal 143, or cable signal 145 (see FIGS. 1-3). In some embodiments, signal input 450 (FIG. 4) is configured to receive the multimedia content signal, as in operation 502. After receipt of the multimedia content signal in operation 502, the next frame in the signal is detected (operation 504). In some implementations, receiver 460 is configured for frame detection, as in operation 504. After frame detection, method 500, as shown in FIG. 5, follows two parallel and simultaneous paths as the incoming frame is written to the buffer (operation 506).

One path, shown as a sub-process in FIG. 5, is referred to as segment processing 512. Segment processing 512 includes the remediation operations performed on buffered frames, and is described relative to one buffered frame. It is noted that segment processing 512 may be repeated for subsequently buffered frames (not shown in FIG. 5). A segment in the buffered frame is selected (operation 508). The segment may then be remediated (operation 530, see also FIG. 6). After possible remediation in operation 530, a decision is made whether or not the frame is presently uncorrupted (operation 510). If the result of operation 510 is NO, then method 500 returns to operation 508, from where additional segments are selected and processed. If the result of operation 510 is YES, then segment processing 512 is complete.

The other path which begins parallel to segment processing 512 is also a sub-process in FIG. 5, denoted as FIFO frame buffering 520. FIFO frame buffering 520 involves the advancement of frames in the frame buffer and may be executed by buffer 416 (see FIG. 4). For a given frame, a decision is made whether the frame is the last frame in the buffer (operation 514). If the result of operation 514 is YES, then the frame is output for display (operation 518). If the result of operation 514 is NO, then the frame is advanced in the buffer (operation 516). In some embodiments of operation 516, frame advancement occurs synchronous to receiving a new frame in the buffer.

Since sub-processes 512 and 520 run parallel to one another, certain system constraints, such as buffer size, network capacity, processing capacity, etc., may govern the performance of a given embodiment of method 500.

Figure 6:
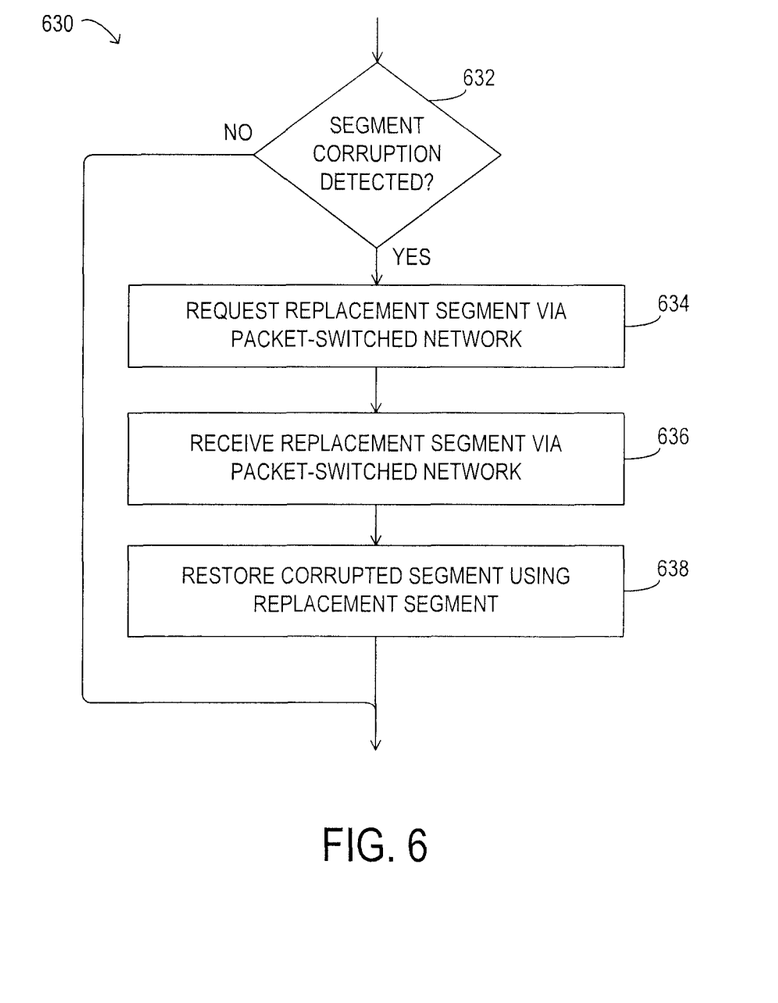
FIG. 6 illustrates another embodiment of a method for remediating a multimedia content signal.

Referring now to FIG. 6, one embodiment of a method 630 for remediating a multimedia content signal is shown. In particular, method 630 depicts one embodiment of segment remediation for a given frame. Method 630 may serve as an example of operation 530, shown in FIG. 5. First, a decision is made whether or not segment corruption in the frame is detected (operation 632). If the result of operation 632 is NO, then method 630 is completed. If the result of operation 632 is YES, then a replacement segment for the corrupted segment is requested via packet-switched network (operation 634). In some embodiments of operation 634, the replacement segment is requested from multimedia service provider 110 via packet-switched network 130, as shown in FIGS. 1-3. The replacement segment may then be received via packet-switched network (operation 636). In certain embodiments of operation 636, multimedia service provider 110 sends the replacement segment via packet-switched network 130, as shown in FIGS. 1-3. Then, the corrupted segment is replaced using the replacement segment (operation 638). Although method 630 is described with respect to a single segment, multiple instances of method 630 may be executed in parallel. In some cases, method 630 involves requesting and receiving multiple segments for restoring a corrupted frame.

Figure 7:
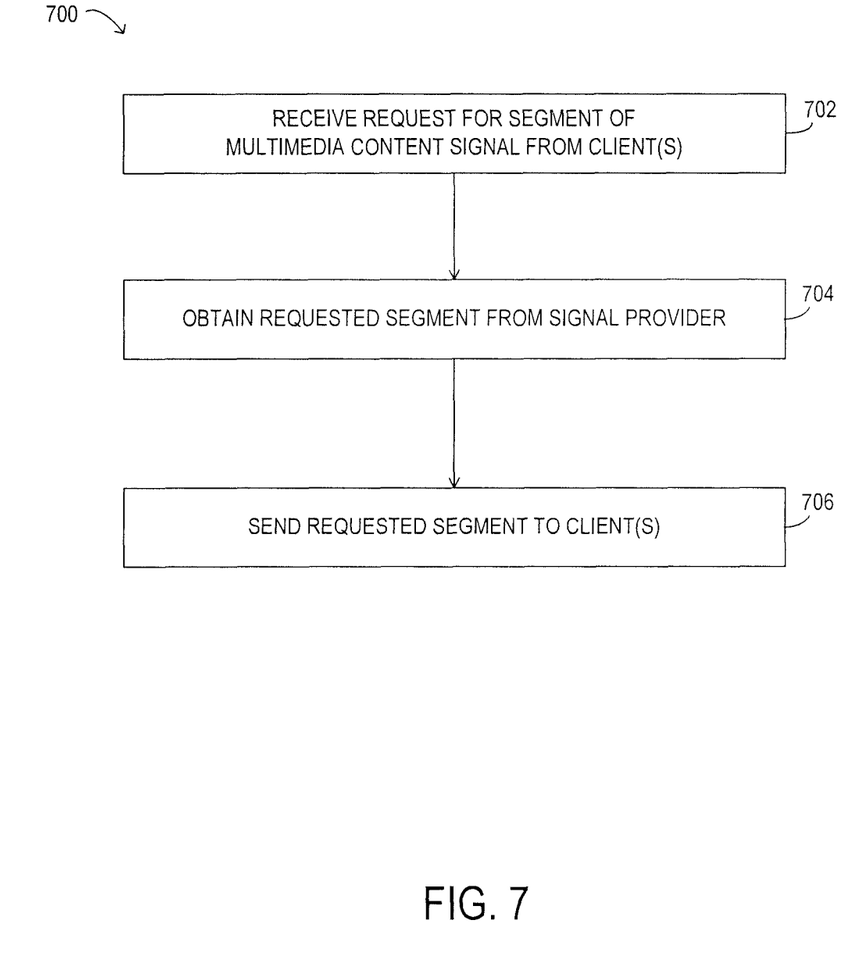
FIG. 7 illustrates an embodiment of a method for obtaining multimedia content signal data.

Referring now to FIG. 7, one embodiment of method 700 for obtaining multimedia content signal data is shown. It is noted that in some embodiments, method 700 is performed by multimedia service provider 110. A request for an original segment from a multimedia content signal is received from one or more clients (operation 702). In some implementations of operation 702, client 120 specifies a segment for remediation in the request received by multimedia service provider 110. In some cases, a plurality of clients request the same segment in operation 702. Next, the requested segment is obtained from a signal provider of the original multimedia content signal (operation 704). In operation 704, multimedia service provider 110 may communicate via link 151 with broadcaster 150, via link 153 with satellite broadcaster 152, or via link 155 with cable service provider 154 (see FIGS. 1-3), for obtaining the requested original segment. After obtaining the requested original segment in operation 704, the requested segment is sent to one or more clients (operation 706). In some embodiments, a segment is multicast to a plurality of clients in operation 706.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A client device, comprising:
   a processor;
   a co-axial cable receiver to receive a multimedia content signal from a cable service provider via a co-axial medium, the multimedia content signal carrying a television program;

an adapter to receive replacement multimedia content from a broadband service provider, different than the cable service provider, via a broadband IP medium different than the co-axial medium;

memory media, accessible to the processor, including processor-executable program instructions that, when executed by the processor, perform operations comprising:

receiving, from the cable service provider via the co-axial medium, the multimedia content signal carrying the television program;

responsive to detecting a corrupted portion of the television program received from the co-axial medium, obtaining replacement multimedia content from the broadband service provider via the broadband IP medium; and responsive to receiving the replacement multimedia content via the broadband IP medium, remediating the corrupted portion of the television program to produce a remediated television program;

providing the remediated television program to a decoder; and generating, by the decoder, a native format video stream in a format compliant with a television display;

wherein:

the television program comprises a plurality of frames; and receiving the multimedia content signal includes:
  detecting a particular frame in the multimedia content signal;
  storing the particular frame in a buffer to create a buffered frame; and
  determining whether the buffered frame is corrupted;
the particular frame consists of a plurality of frame segments;
each of the plurality of frame segments corresponds to a particular number of image pixels; and
determining whether the buffered frame is corrupted includes determining whether any of the frame segments is corrupted.

2. A method, comprising:
receiving from a resource of a first multimedia provider, by a multimedia client device, via a co-axial medium, a television signal carrying a television program;
responsive to detecting a corrupted portion of the television program received via the co-axial medium from the first multimedia provider, communicating, via a second transmission medium, different than the co-axial medium, with a resource of a second multimedia provider, different than the first multimedia provider, to obtain replacement multimedia content via the second transmission medium;
responsive to receiving the replacement multimedia content via the second transmission medium, remediating the corrupted portion to produce a remediated television program; and
processing the remediated television program to generate a native format video stream in a format compliant with a television display;
wherein:
the television program comprises a plurality of frames; and
receiving the multimedia content signal includes:
  detecting a particular frame in the multimedia content signal;
  storing the particular frame in a buffer to create a buffered frame; and
  determining whether the buffered frame is corrupted;
the particular frame consists of a plurality of frame segments;
each of the plurality of frame segments corresponds to a particular number of image pixels; and
determining whether the buffered frame is corrupted includes determining whether any of the frame segments is corrupted.

3. The method of claim 2, wherein:
the particular frame comprises a next frame in the television signal.

4. The method of claim 3, further comprising:
determining a size of the frame segments based on a size of the particular frame, wherein each frame consists of a particular number of frame segments.

5. A non-transitory computer readable medium including processor executable instructions that, when executed by a processor of a multimedia client device, cause the client device to perform operations, comprising:
receiving, via a co-axial medium, a multimedia content signal transmitted by a transmitter of a first system, the multimedia content signal including a television program;
responsive to detecting a corrupted portion of the multimedia content signal received via the co-axial medium, communicating with a network server of a broadband provider, different than a content provider of the multimedia content signal, via a broadband IP medium, different than the co-axial medium, to obtain replacement multimedia content via the broadband IP medium;
responsive to receiving the replacement multimedia content via the broadband IP medium from the network server, remediating the corrupted portion to produce a remediated multimedia content signal; and
providing the remediated multimedia content signal to a decoder;
generating, by the decoder, a native format video stream in a format compliant with a television display
wherein:
the television program comprises a plurality of frames; and
receiving the multimedia content signal includes:
  detecting a particular frame in the multimedia content signal;
  storing the particular frame in a buffer to create a buffered frame; and
  determining whether the buffered frame is corrupted;
the particular frame consists of a plurality of frame segments;
each of the plurality of frame segments corresponds to a particular number of image pixels; and
determining whether the buffered frame is corrupted includes determining whether any of the frame segments is corrupted.

6. The non-transitory computer readable medium of claim 5, wherein the television program includes a sequence of frames and wherein:
detecting the particular frame comprises detecting a next frame in the sequence of frames.

7. The non-transitory computer readable medium of claim 6, further comprising:

determining a frame segment size based on a size of the particular frame.

8. The method of claim 1, wherein communicating via the second transmission medium comprises communicating via a packet switched network.

9. The method of claim 8, wherein the packet switched network comprises the Internet.

10. The method of claim 1, wherein the television signal comprises a terrestrially broadcast television signal.

11. The method of claim 1, wherein the television signal comprises a satellite signal.

* * * * *

UNITED STATES PATENT AND TRADEMARK OFFICE
CERTIFICATE OF CORRECTION

PATENT NO. : 9,461,760 B2
APPLICATION NO. : 12/260872
DATED : October 4, 2016
INVENTOR(S) : Marc Sullivan, Steven M. Belz and James Pratt Page 1 of 2

It is certified that error appears in the above-identified patent and that said Letters Patent is hereby corrected as shown below:

In the Claims

Please rearrange, amend, and/or renumber claims 5-11 as follows:

[[8]] 5. The method of claim [[1]] 2, wherein communicating via the second transmission medium comprises communicating via a packet switched network.

[[9]] 6. The method of claim [[8]] 5, wherein the packet switched network comprises the Internet.

[[10]] 7. The method of claim [[1]] 2, wherein the television signal comprises a terrestrially broadcast television signal.

[[11]] 8. The method of claim [[1]] 2, wherein the television signal comprises a satellite signal.

[[5]] 9. A non-transitory computer readable medium including processor executable instructions that, when executed by a processor of a multimedia client device, cause the client device to perform operations, comprising:
 receiving, via a co-axial medium, a multimedia content signal transmitted by a transmitter of a first system, the multimedia content signal including a television program;
 responsive to detecting a corrupted portion of the multimedia content signal received via the co-axial medium, communicating with a network server of a broadband provider, different than a content provider of the multimedia content signal, via a broadband IP medium, different than the co-axial medium, to obtain replacement multimedia content via the broadband IP medium;
 responsive to receiving the replacement multimedia content via the broadband IP medium from the network server, remediating the corrupted portion to produce a remediated multimedia content signal; and Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,461,760 B2 providing the remediated multimedia content signal to a decoder;
    generating, by the decoder, a native format video stream in a format compliant with a television display;
    wherein:
    the television program comprises a plurality of frames; and
    receiving the multimedia content signal includes:
    detecting a particular frame in the multimedia content signal;
    storing the particular frame in a buffer to create a buffered frame; and
    determining whether the buffered frame is corrupted;
    the particular frame consists of a plurality of frame segments;
    each of the plurality of frame segments corresponds to a particular number of image pixels; and
    determining whether the buffered frame is corrupted includes determining whether any of the frame segments is corrupted.

[[6]] 10. The non-transitory computer readable medium of claim [[5]] 9, wherein the television program includes a sequence of frames and wherein:
    detecting the particular frame comprises detecting a next frame in the sequence of frames.

[[7]] 11. The non-transitory computer readable medium of claim [[6]] 10, further comprising:
    determining a frame segment size based on a size of the particular frame.